(12) United States Patent
Yang et al.

(10) Patent No.: US 12,533,998 B2
(45) Date of Patent: Jan. 27, 2026

(54) ADVANCED ELECTRONIC CONTROL UNIT FOR POWER AUTOMOTIVE SEATS

(71) Applicant: Magna Seating Inc., Aurora (CA)

(72) Inventors: Hanlong Yang, Novi, MI (US); Pragathi Prasanna Kumar, Farmington Hills, MI (US); Balasaranya Chitta, Farmington Hills, MI (US)

(73) Assignee: Magna Seating Inc., Aurora (CA)

( * ) Notice: Subject to any disclaimer, the term of this patent is extended or adjusted under 35 U.S.C. 154(b) by 151 days.

(21) Appl. No.: 17/921,109

(22) PCT Filed: Apr. 30, 2021

(86) PCT No.: PCT/US2021/030047
§ 371 (c)(1),
(2) Date: Oct. 24, 2022

(87) PCT Pub. No.: WO2021/222677
PCT Pub. Date: Nov. 4, 2021

(65) Prior Publication Data
US 2023/0166639 A1 Jun. 1, 2023

Related U.S. Application Data (60) Provisional application No. 63/018,856, filed on May 1, 2020.

(51) Int. Cl.
*B60N 2/02* (2006.01)
*B60R 16/037* (2006.01)

(52) U.S. Cl.
CPC ....... *B60N 2/0248* (2013.01); *B60N 2/02246* (2023.08); *B60N 2/0226* (2023.08);
(Continued)

(58) Field of Classification Search
CPC .................................................. B60N 2/0248
See application file for complete search history.

(56) References Cited

U.S. PATENT DOCUMENTS

| 4,463,426 A | 7/1984 | Caddick et al. |
| 4,510,426 A | 4/1985 | Michaels et al. |

(Continued)

FOREIGN PATENT DOCUMENTS

| CN | 109532577 | 3/2019 |
| CN | 110936857 | 3/2020 |

(Continued)

OTHER PUBLICATIONS

Morita, Takeshi, et al. A Smooth Impact Rotation Motor Using a Multi-Layered Torsional Piezoelectric Actuator, Ieee transactions on ultrasonics, ferroelectrics, and frequency control, vol. 46, No. 6, Nov. 1999 1439 (https://ieeexplore.ieee.org/stamp/stamp.jsp?tp=&arnumber=808867) (Year: 1999).*

*Primary Examiner* — Jean Paul Cass
(74) *Attorney, Agent, or Firm* — Miller, Canfield, Paddock and Stone (57) ABSTRACT

An electronic control unit configured to control at least one motor used to reposition a seat assembly within an automotive vehicle. The electronic control unit comprises a mode manager configured to reposition the seat assembly from a first position to a second position and a performance evaluation module configured to monitor the repositioning of the seat assembly. The performance evaluation module detects and compensates for abrupt stops in the at least one motor.

23 Claims, 11 Drawing Sheets

(52) U.S. Cl.
CPC .......... *B60N 2/0296* (2013.01); *B60N 2/0272* (2023.08); *B60N 2210/14* (2023.08); *B60N 2220/10* (2023.08); *B60N 2220/20* (2023.08); *B60N 2230/20* (2023.08); *B60R 16/037* (2013.01)

(56) References Cited

U.S. PATENT DOCUMENTS

| | | |
|---|---|---|
| 6,243,635 B1 | 6/2001 | Swan et al. |
| 6,538,405 B1 | 3/2003 | Brzozowski et al. |
| 9,616,774 B2 | 4/2017 | Itou |
| 10,293,711 B2 | 5/2019 | Lee et al. |
| 10,363,837 B2 | 7/2019 | Lee et al. |
| 2008/0216567 A1* | 9/2008 | Breed .................. B60R 21/013 73/146.5 |
| 2012/0089299 A1* | 4/2012 | Breed .................. B60R 21/013 701/1 |
| 2020/0017000 A1 | 1/2020 | Lee et al. |

FOREIGN PATENT DOCUMENTS

| | | | |
|---|---|---|---|
| DE | 19522897 | 1/1997 | |
| EP | 3403594 A1 * | 11/2018 | ............. A61B 17/00 |
| KR | 20050114320 | 12/2005 | |
| KR | 20190128287 | 11/2019 | |
| KR | 20200065302 | 6/2020 | |
| WO | WO-2016036653 A2 * | 3/2016 | ............. A61B 17/00 |

\* cited by examiner

ADVANCED ELECTRONIC CONTROL UNIT FOR POWER AUTOMOTIVE SEATS

CROSS-REFERENCE TO RELATED APPLICATIONS

This application claims priority to U.S. provisional patent application 63/018,856, filed on May 1, 2020, the disclosure of which is incorporated herein by reference.

TECHNICAL FIELD

The present invention relates to an advanced electronic control unit to control the motion of a seat assembly in an automotive vehicle, and to compensate for changes in motor and/or seat performance.

BACKGROUND OF THE INVENTION

Seat assemblies in automotive vehicles typically include systems to control the movement and positioning of the seat assemblies. Over time, performance of the systems degrades due to voltage changes or sensor drifts or component aging which may impede the smooth transition between seat configurations, or alter the expected positioning of the seat assembly. Therefore, there is a need for a system that can compensate for any variations that occur over time.

SUMMARY OF THE INVENTION

Next generation seating systems will be greatly impacted by the development of autonomous driving and electric vehicles. Vehicle seat assemblies need to be "smart" and be able to have flexible and collaborative configurations to accommodate new customer experiences in the era of the autonomous vehicle/electric vehicle ride-sharing business models. The present invention will allow the seat assemblies to accommodate multiple reconfigurations that are achievable by the mechanical design of the seat assembly. The present invention will also enable and enhance software modularity and reusability.

According to one embodiment, there is provided an electronic control unit configured to control at least one motor used to reposition a seat assembly within an automotive vehicle. The electronic control unit comprises a mode manager configured to reposition the seat assembly from a first position to a second position and a performance evaluation module configured to monitor the repositioning of the seat assembly. The performance evaluation module detects and compensates for abrupt stops in the motor.

According to another embodiment, there is provided a method for controlling operation of at least one motor used to reposition a seat assembly in an automotive vehicle from a first position to a second position. The method comprises the steps of monitoring the operation of the at least one motor; determining an impact on the motor when the motor stops; determining if the impact increases over time; and if it is determined that the impact increases over time, compensating for the increase in impact.

According to another embodiment, there is provided an electronic control unit configured to control at least one motor used to reposition a seat assembly within an automotive vehicle. The electronic control unit comprises a mode manager configured to reposition the seat assembly from a first position to a second position and a performance evaluation module configured to monitor movement of the motor. The performance evaluation module detects and overcomes increased friction in the movement of the motor.

According to another embodiment, there is provided a method for controlling operation of at least one motor used to reposition a seat assembly in an automotive vehicle from a first position to a second position. The method comprises the steps of monitoring movement of the at least one motor; determining if the motor encounters increased friction in the movement of the motor; and if it is determined that the motor encounters increased friction, compensating for the increased friction.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF EXAMPLE EMBODIMENTS

Figure 1A:
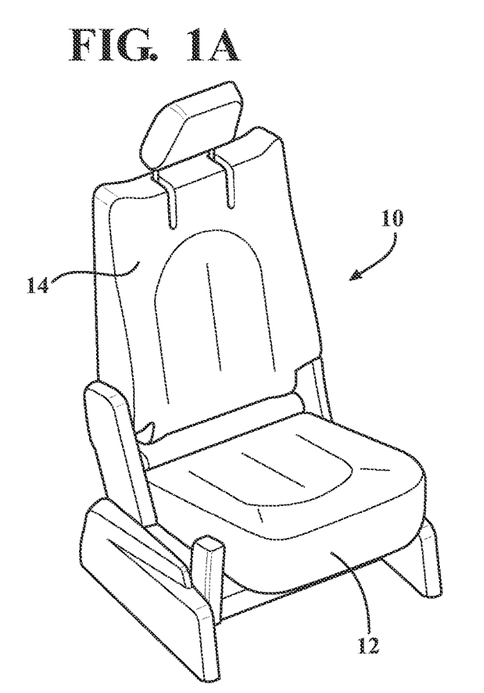
FIGS. 1A-1D are perspective views of a seat assembly in different seat configurations in accordance with one embodiment of the present invention.
Figure 1B:
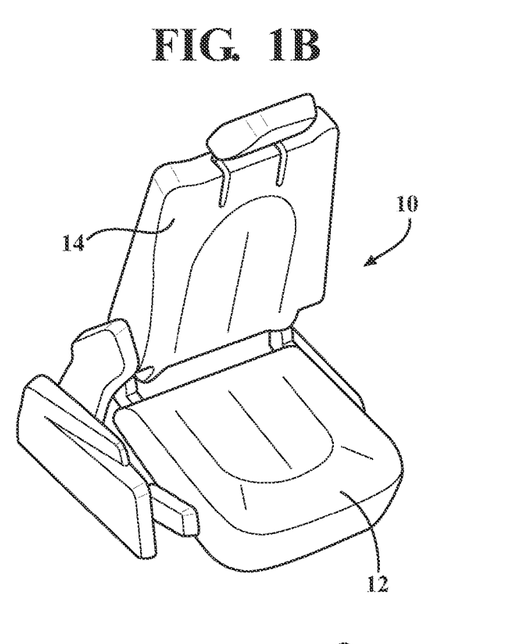
Figure 1C:
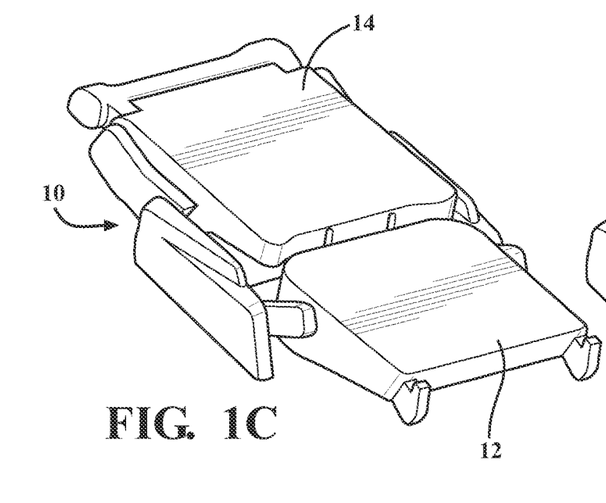
Figure 1D:
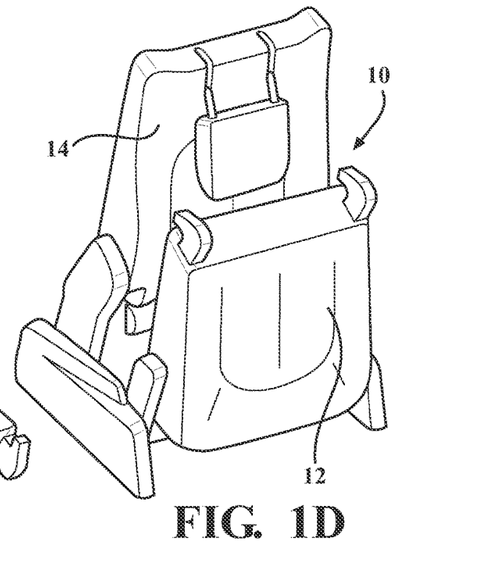

The present invention relates to an advanced electronic control unit (ECU) 20 for controlling the movement and positioning of a seat assembly 10 having a seat cushion 12, a seat back 14, and a plurality of motors (not shown) in an automotive vehicle. For example, the advanced ECU 20 may reposition the seat back 14 and the seat cushion 12 between a generally upright seating position (FIG. 1A), a pitched forward position (FIG. 1B), a fold flat position (FIG. 1C), and an upright stow position (FIG. 1D). The advanced ECU 20 also may swivel the seat assembly 10 to allow a seat occupant to face the front or the rear of the automotive vehicle, or at any angle in between. The advanced ECU 20 may also raise and lower the seat assembly 10, or move the seat assembly 10 in the forward and rearward directions. The advanced ECU 20 not only controls the movement and positioning of the seat assembly 10, but the advanced ECU 20 also monitors these activities to ensure that they are working properly, and adjusts for any parameter changes over time.

Figure 2:
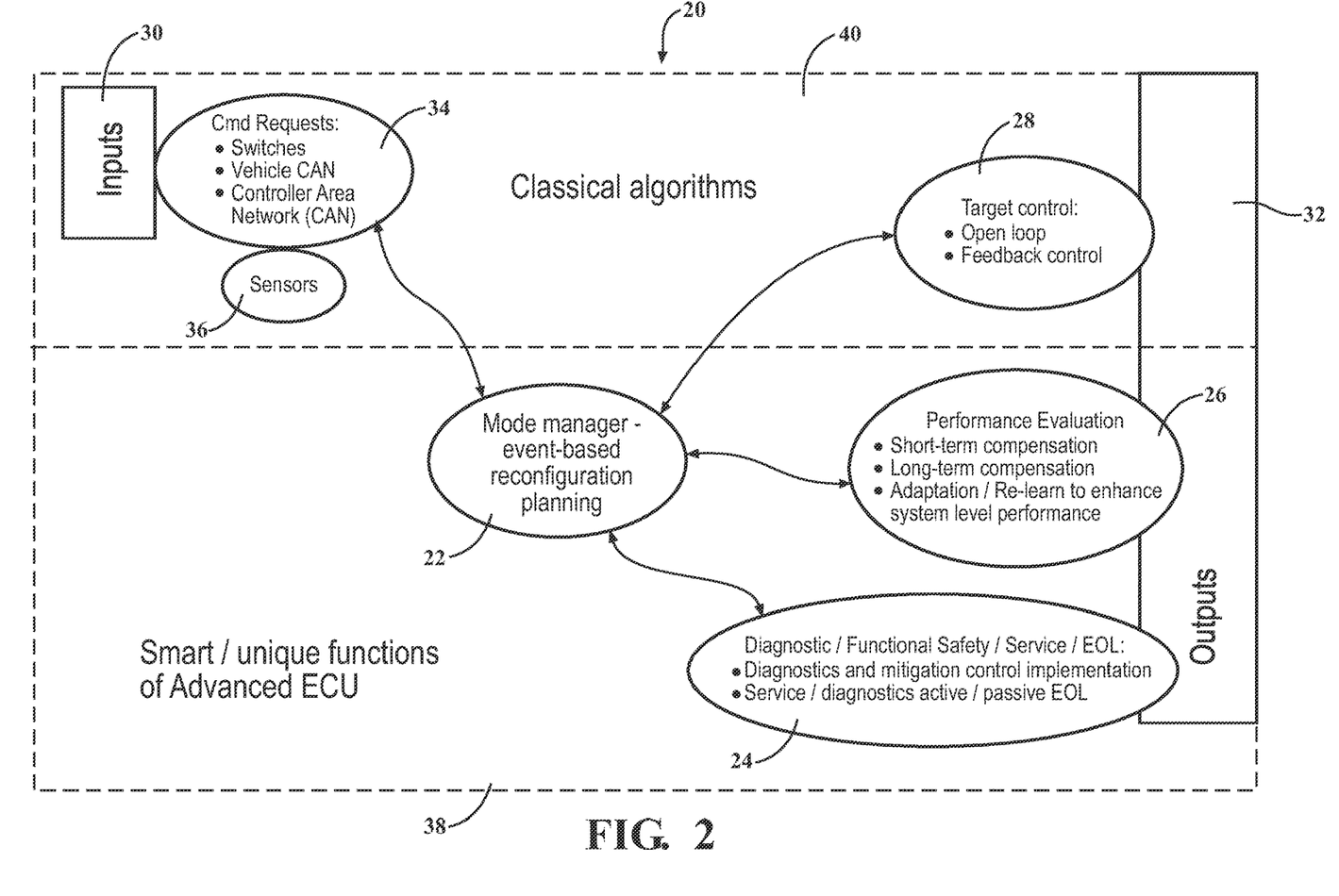
FIG. 2 depicts the functional architecture of an advanced electronic control unit in accordance with the present invention.

Referring to FIG. 2, the advanced ECU 20 is programmed with modular subroutines, command logic, diagnostics, memory position recall as well as specialty routines such as a dampening function and a kicking function. The advanced ECU 20 includes a mode manager 22, a diagnostics module 24, a performance evaluation module 26 and a target control module 28. Inputs 30 into the advanced ECU 20 include command requests 34, which may originate from switches or from the vehicle Controller Area Network (CAN) or from a Local Interconnection Network (LIN), as well as sensor inputs 36. The mode manager 22 receives and processes information regarding the operation of the seat assemblies 10. For example, the mode manager 22 tracks the current configuration of the seat assemblies 10 within the automotive vehicle, determines what changes to the vehicle seat configuration are being requested, and determines how the changes to the vehicle seat configuration will be implemented. Thus, the mode manager 22 is responsible for reconfiguration planning, and controls event-based algorithms. The mode manager 22 considers the current status as well as past performance to determine the parameters that will be used to control the movement and positioning of the seat assembly 10.

The mode manager 22 sends instructions to the target control module 28 to control the plurality of motors in the seat assembly 10. The target control module 28 uses either open loop or closed loop control systems. With an open loop control system, the target control module 28 uses a fixed value to drive the motor. With feedback from a closed loop control system, the target control module 28 may adjust the duty cycle or power to compensate for a slower motor to ensure the seat assembly 10 reaches a target position with the same target speed of movement.

The diagnostics module 24 records any problems encountered during reconfiguration of the seat assemblies 10. This provides more intelligence to the mode manager 22 to handle recovery of seats, self-improvement and self-corrections under various mal-operations, change of mind, servicing, and end-of-life (EOL) verifications. The diagnostics module 24 records the data via passive monitoring as well as intrusive commands. The diagnostics module 24 includes sensor failure detection, as well as diagnostics and mitigation algorithms.

The performance evaluation module 26 monitors operation of the seat assemblies 10, and provides both short-term and long-term compensation for any changes that may occur over time. For example, the performance evaluation module 26 monitors for changes in performance such as if a motor moves too slowly or if a motor stops abruptly. The performance evaluation module 26 also monitors for sensor drifts, voltage changes, and degradation of actuators. With long-term compensation, data is collected periodically (e.g., every 100 ignition cycles), so over time (e.g., after 5000 ignition cycles) one can observe trends in the data. The trends can indicate a potential degradation in the system. For example, if the system needs 20% more power to perform the same movement after 5000 ignition cycles, that is an indication that the motor has degraded over time. The performance evaluation module 26 adapts to changes in the operation of the seat assembly 10, and is able to relearn the positions of various sensors to enhance system level performance, improve the calibration process, enable robust performance across all component variations, and enable longer useful life cycles of motors and controllers by avoiding faulty controls, overcurrent operation, abusive collisions at hard-stops, etc. Any parameter changes or problems encountered by motors in the seat assembly 10 are stored in non-volatile memory, such as non-volatile random-access memory (NVRAM) or electrically erasable programmable read-only memory (EEPROM), to ensure that the information continues to be stored in memory even after power is turned off to the automotive vehicle.

The smart/unique functions 38 included in the advanced ECU 20 are the mode manager 22, the diagnostics module 24 and the performance evaluation module 26, whereas the target control module 28 and the inputs 30 are classical control algorithms 40. Classical control algorithms 40 use PID ("Proportional, Integral and Derivative") and other theories to handle specific motion and target tracking. The target control module 28, the performance evaluation module 26, and the diagnostics module 24 provide output signals through an output module 32.

Figure 3:
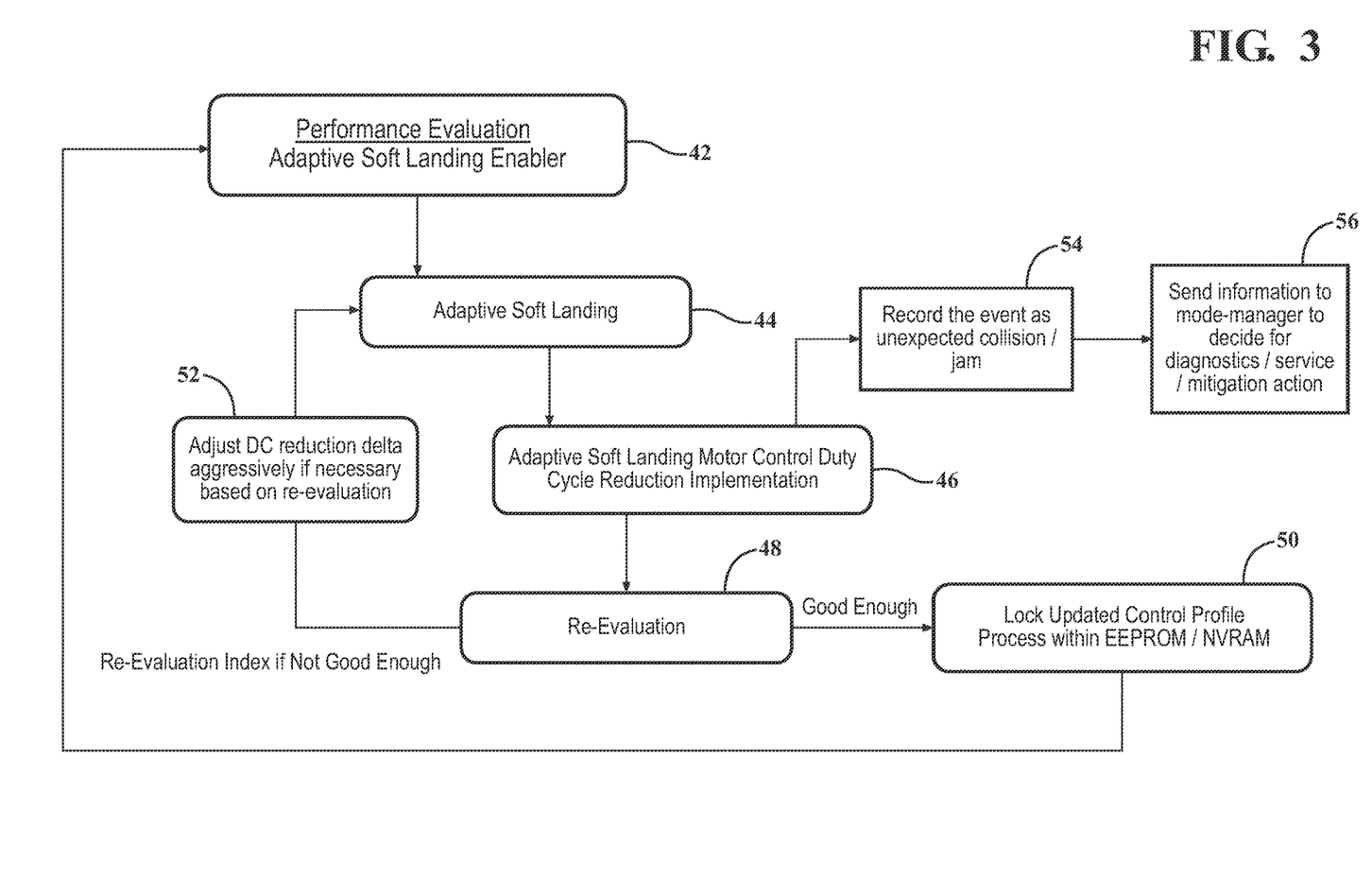
FIG. 3 depicts a flow diagram of a process performed by the advanced electronic control unit in accordance with one embodiment of the present invention.

FIG. 3 illustrates an overview of the method for enabling and disabling adaptive soft landing. Under normal circumstances, the adaptive soft landing enabler 42 is activated, and the performance evaluation module 26 monitors the smoothness with which the at least one motor stops. An abrupt stop of the motor will cause the motor to degrade more quickly. If the performance evaluation module 26 determines that the motor stops too abruptly, the performance evaluation module 26 will enable the adaptive soft landing 44. The adaptive soft landing 44 will adjust the duty cycle of the motor to reduce the impact with which the motor stops (step 46).

The performance evaluation module 26 will then re-evaluate the abruptness with which the at least one motor stops (step 48). If the performance evaluation module 26 determines that reducing the duty cycle adequately accommodates for the abrupt motor stop, it will lock the updated control process within the EEPROM or NVRAM (step 50), deactivate the adaptive soft landing 44 and reactivate the adaptive soft landing enabler 42. If after re-evaluation (step 48) the motor continues to stop too abruptly, the performance evaluation module 26 will continue to reduce the duty cycle of the motor and may reduce it aggressively, if necessary, based on the re-evaluation (step 52). The duty cycle reduction will be within a defined, calibratable range. The adaptive soft landing 44 remains activated until the performance evaluation module 26 determines that the reduction in the duty cycle adequately accommodates for the abrupt motor stop at step 48. If the performance evaluation module 26 detects an unexpected jam, it records the event (step 54) and sends the information to the mode manager 22 for further evaluation (i.e., to determine whether diagnostics or service are required and/or to determine any mitigation action) (step 56).

Figure 4:
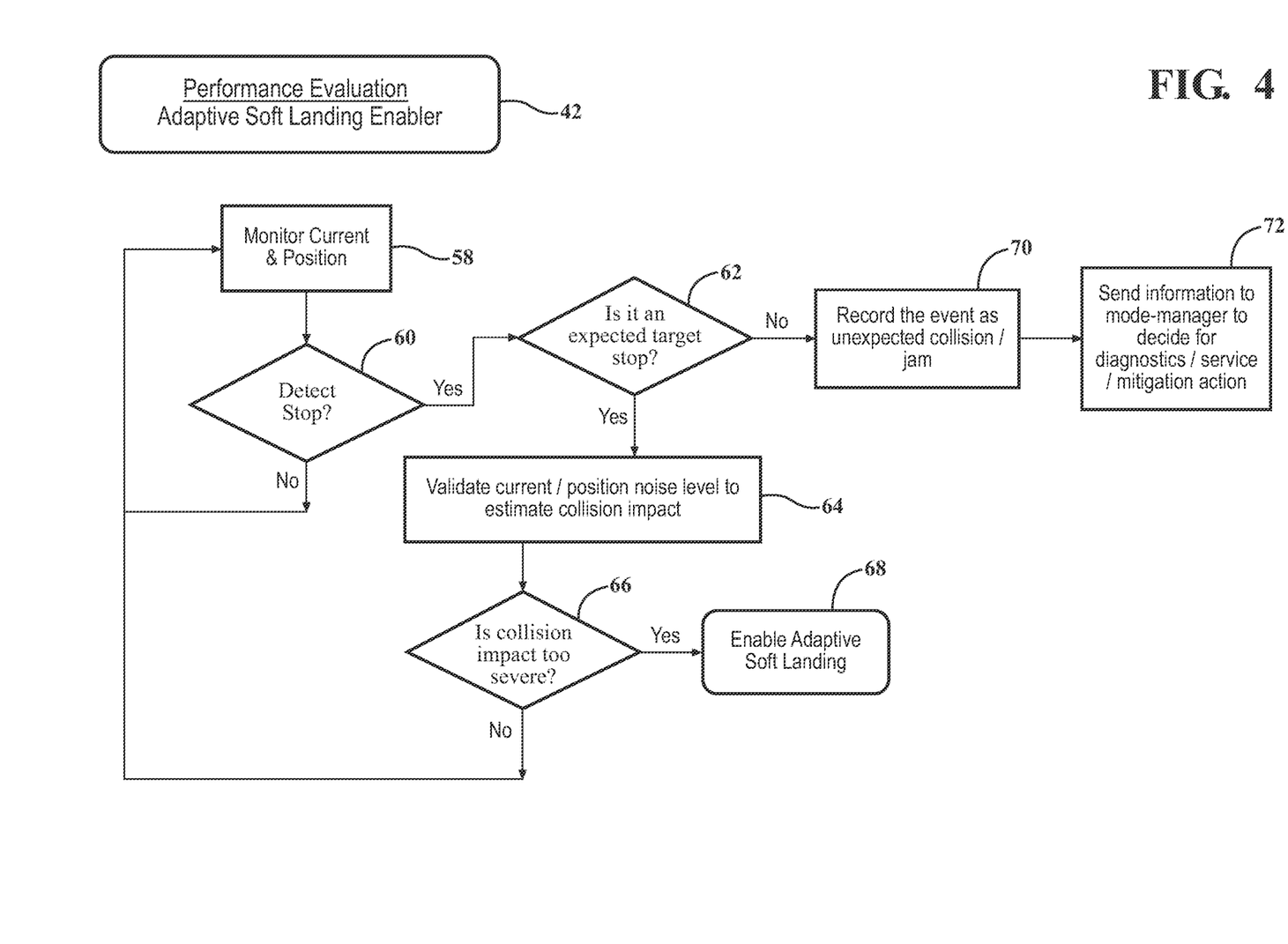
FIG. 4 depicts a flow diagram of a portion of the process depicted in FIG. 3.

FIG. 4 shows a flow chart of the process performed by the performance evaluation module 26 with the adaptive soft landing enabler 42 activated. The performance evaluation module 26 monitors the current draw and position of the at least one motor (step 58) to determine when the motor has stopped (step 60). If the motor stop is expected (step 62), the performance evaluation module 26 validates the current draw and motor position noise levels to estimate the collision impact (step 64), and determines whether the motor stop was too severe (step 66). The performance evaluation module 26 monitors for severe motor stops because severe stops will cause the motor to degrade more quickly. If the motor stop was not too severe, the performance evaluation module 26 continues to monitor the current draw and motor position (step 58) to determine when the motor has stopped (step 60). If at step 66 the motor stop was too severe, then the performance evaluation module 26 enables the adaptive soft landing 44 for future motor movements (step 68). If at step 62 the motor stop is unexpected, the performance evaluation module 26 records the event as an unexpected collision (step 70), and sends the information to the mode manager 22 for further evaluation (i.e., to determine whether diagnostics or service are required and/or to determine any mitigation action) (step 72).

Figure 5:
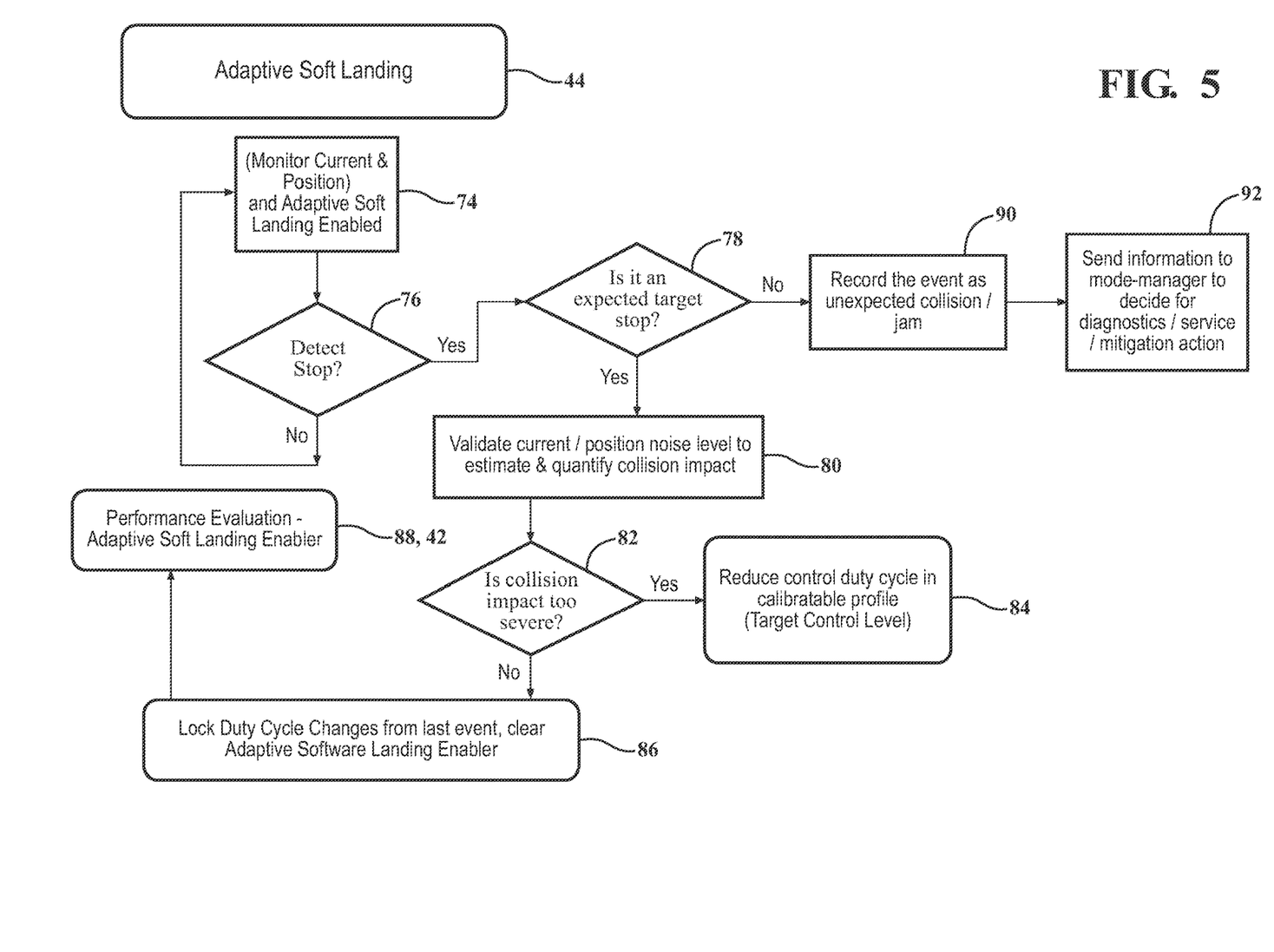
FIG. 5 depicts a flow diagram of another portion of the process depicted in FIG. 3.

FIG. 5 shows a flow chart of the process performed by the performance evaluation module 26 with the adaptive soft landing 44 enabled. The performance evaluation module 26 continues to monitor the current draw and the position of the motor (step 74) to determine when the at least one motor has stopped (step 76). The performance evaluation module 26 determines if the motor stop is expected (step 78). If the motor stop is expected, the performance evaluation module 26 validates the current draw and motor position noise level to estimate the collision impact (step 80), and determines whether the motor stop was too severe (step 82). If the motor stop was too severe, then the performance evaluation module 26 reduces the control duty cycle in the calibratable profile (step 84) to reduce the abruptness of the motor stop. Otherwise, if the collision is within acceptable limits at step 82, then the performance evaluation module 26 will lock the control duty cycle changes from the last event and clear the adaptive soft landing enabler (step 86). The performance evaluation module will then reactivate the adaptive soft landing enabler (step 88). The adaptive soft landing enabler (step 42) and (step 88) can be setup as the same algorithm. If at step 78 the performance evaluation module 26 determines that the motor stop is unexpected, then the performance evaluation module 26 records the event as an unexpected jam (step 90), and sends information to the mode manager 22 for further evaluation (i.e., to determine whether diagnostics or service are required and/or to determine any mitigation action) (step 92).

Figure 6:
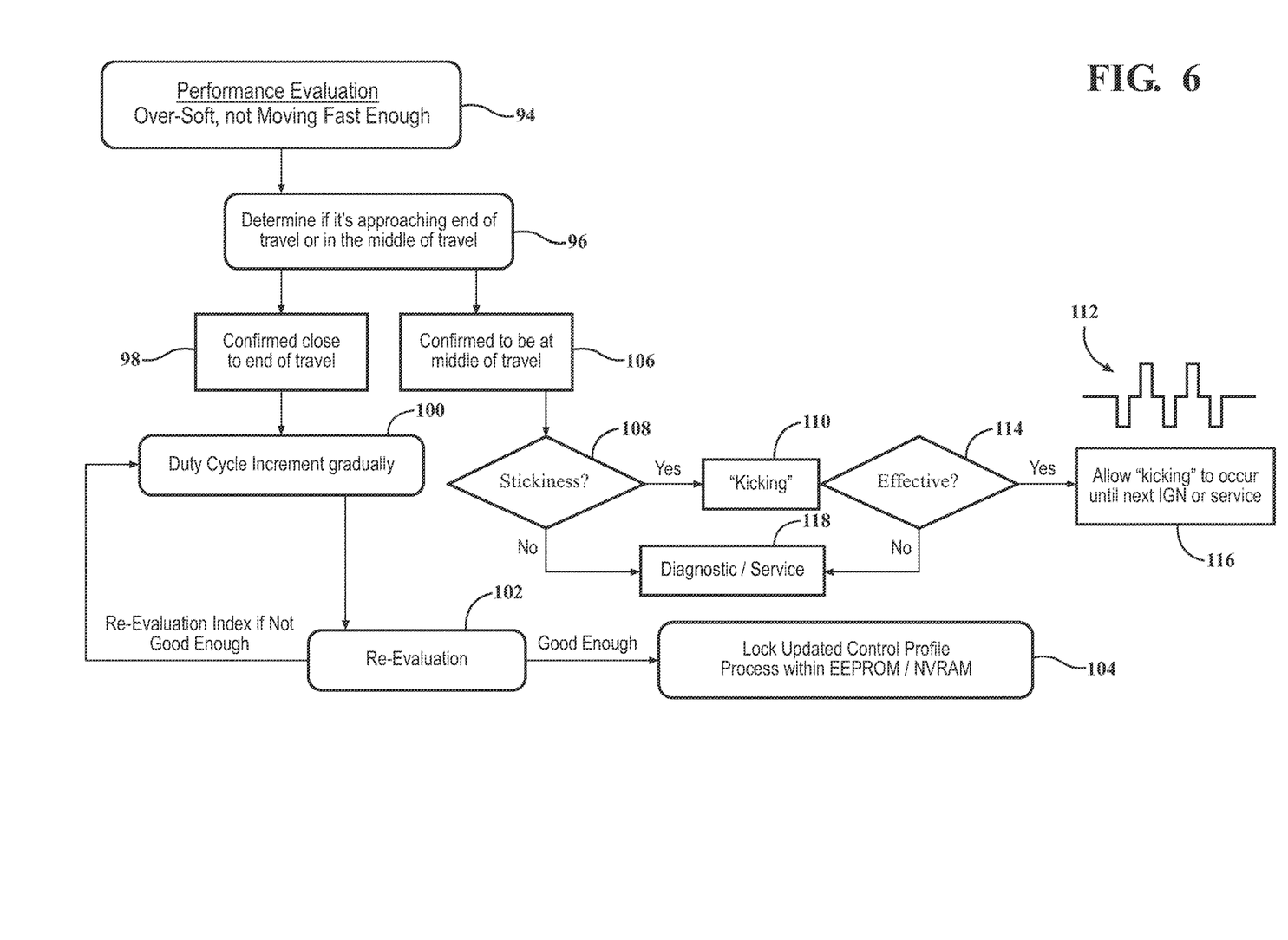
FIG. 6 depicts a flow diagram of a process performed by the advanced electronic control unit in accordance with a second embodiment of the present invention.

Referring to FIG. 6, the performance evaluation module 26 also includes a process to compensate for at least one motor that is over-soft, or not moving fast enough. If the motor is over-soft or not moving fast enough (step 94), the performance evaluation module 26 will determine the current position of the motor (step 96). If the motor is near the end of travel (step 98), then the performance evaluation module 26 will gradually increase the duty cycle to the motor in an attempt to complete the motion of the motor (step 100). The performance evaluation module 26 then reevaluates the position of the motor (step 102). If increasing the duty cycle is effective in getting the motor to reach the end of travel (step 102), then the performance evaluation module 26 stores the increased duty cycle as part of the control profile within the EEPROM or NVRAM (step 104) so that the system will use the increased duty cycle the next time the motor tries to reach the end of travel. If increasing the duty cycle is not effective in getting the motor to reach the end of travel (step 102), then the performance evaluation module 26 will continue increasing the duty cycle (step 100) to try to complete the motion of the motor, or it may report the failure to be serviced.

If at step 96, the performance evaluation module 26 determines that the motor is in the middle of travel (step 106), then an evaluation of stickiness is performed (i.e., the performance evaluation module 26 determines if the motor is encountering increased friction in the movement of the motor) (step 108). If the performance evaluation module 26 concludes that the motor is sticky, then a pattern of kicking control pulses 112 is provided to the motor in an attempt to overcome the stickiness (step 110). The kicking control pulses 112 may include a series of forward and/or rearward control pulses. The strength and/or the frequency of the kicking control pulses 112 may be adjusted to accommodate for various degrees of stickiness. If the kicking control pulses 112 appear to be effective (step 114), then the performance evaluation module 26 will repeat the kicking control pulses 112 the next time it reaches the area where the motor was not moving fast enough (step 116). If the kicking control pulses 112 are ineffective, or if at step 108 the performance evaluation module 26 concludes that the over-softness of the motor is not a result of stickiness, then the performance evaluation module 26 sends the information to the mode manager 22 for further evaluation (i.e., to determine whether diagnostics or service are required and/or to determine any mitigation action) (step 118).

Figure 7:
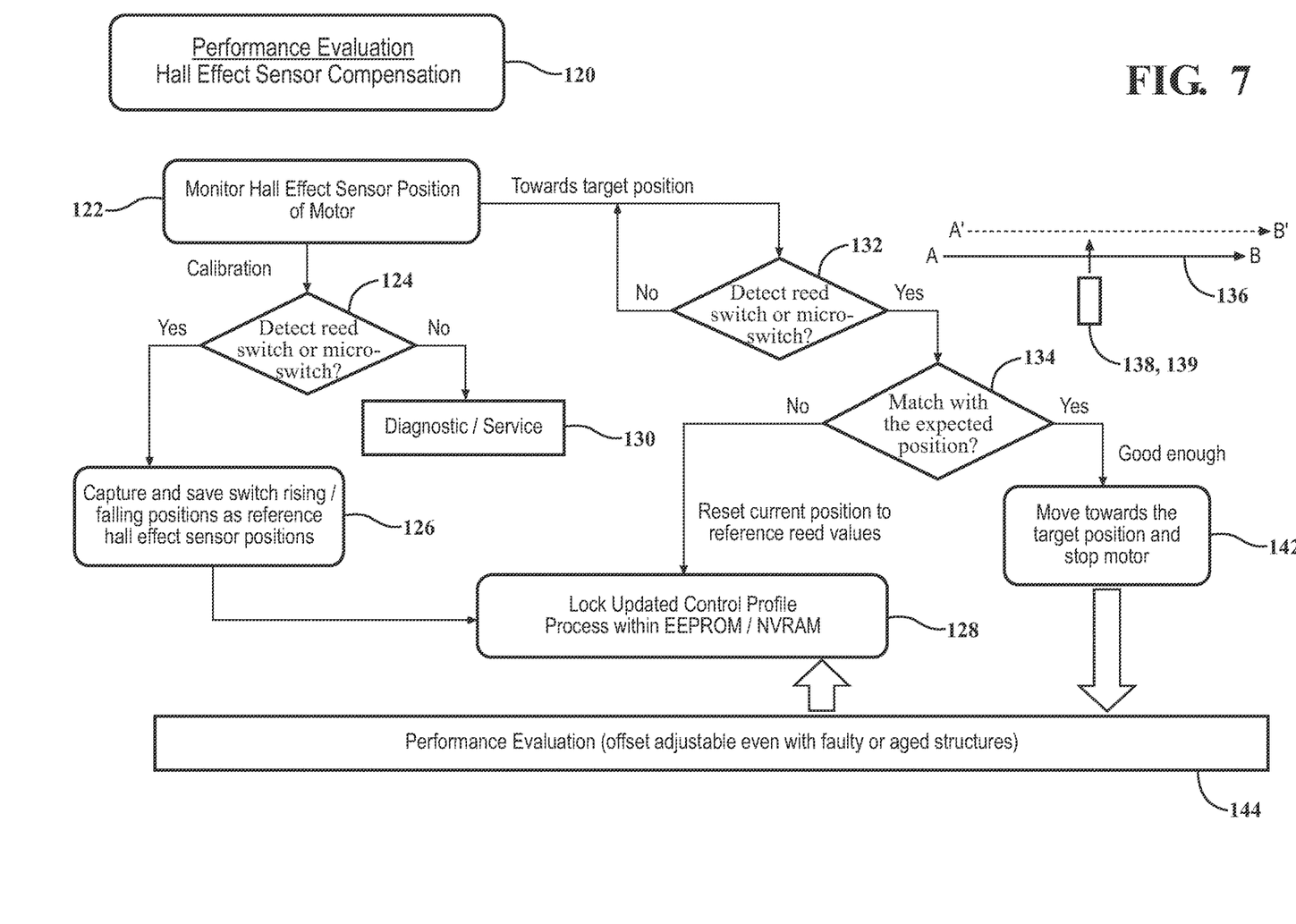
FIG. 7 depicts a flow diagram of a process performed by the advanced electronic control unit in accordance with a third embodiment of the present invention.

Referring to FIG. 7, the performance evaluation module 26 also includes a process 120 to compensate for degradations in a Hall effect sensor, which can drift over time. The performance evaluation module 26 monitors the Hall effect sensor position of the at least one motor (step 122). A Hall effect sensor is typically used in conjunction with a reed switch 138 or micro-switch 139. During calibration, if the performance evaluation module 26 detects the reed switch 138 or micro-switch 139 (step 124), then it captures and saves the rising and falling positions of the reed switch 138 or micro-switch 139 as reference to the Hall effect sensor positions (step 126) and locks the sensor information in the control profile within the EEPROM or NVRAM (step 128). If at step 124 the performance evaluation module 26 does not detect the reed switch 138 or micro-switch 139, then it sends the information to the mode manager 22 for further evaluation (i.e., to determine whether diagnostics or service are required and/or to determine any mitigation action) (step 130).

During operation, as the motor moves toward the target position, the performance evaluation module 26 waits until it detects the reed switch 138 or micro-switch 139 (step 132) and determines whether the reed switch 138 or micro-switch 139 matches with the expected position (step 134). If the position of the reed switch 138 or micro-switch 139 matches, then the motor moves towards the target position and stops (step 142). If not, the performance evaluation module 26 resets the current position to the reference position corresponding to reed switch 138 or micro-switch 139 and updates the control profile process in the EEPROM or NVRAM (step 128). For example, a Hall effect sensor that is used to determine the position of a seat assembly 10 on a track 136 may be calibrated from one point A on the track to another point B on the track. A reed switch 138 or micro-switch 139 placed in a fixed position between the two endpoints A and B assists in determining the amount of drift in the Hall effect sensor. Over time, if the Hall effect sensor drifts so that it believes the endpoints of the track 136 are located at A' and B', then the performance evaluation module 26 will reset the readings on the Hall effect sensor based on the position of the reed switch 138 or micro-switch 139. The performance evaluation module 26 is able to adjust the offset of the Hall effect sensor even with faulty or aged structures (step 144).

Figure 8:
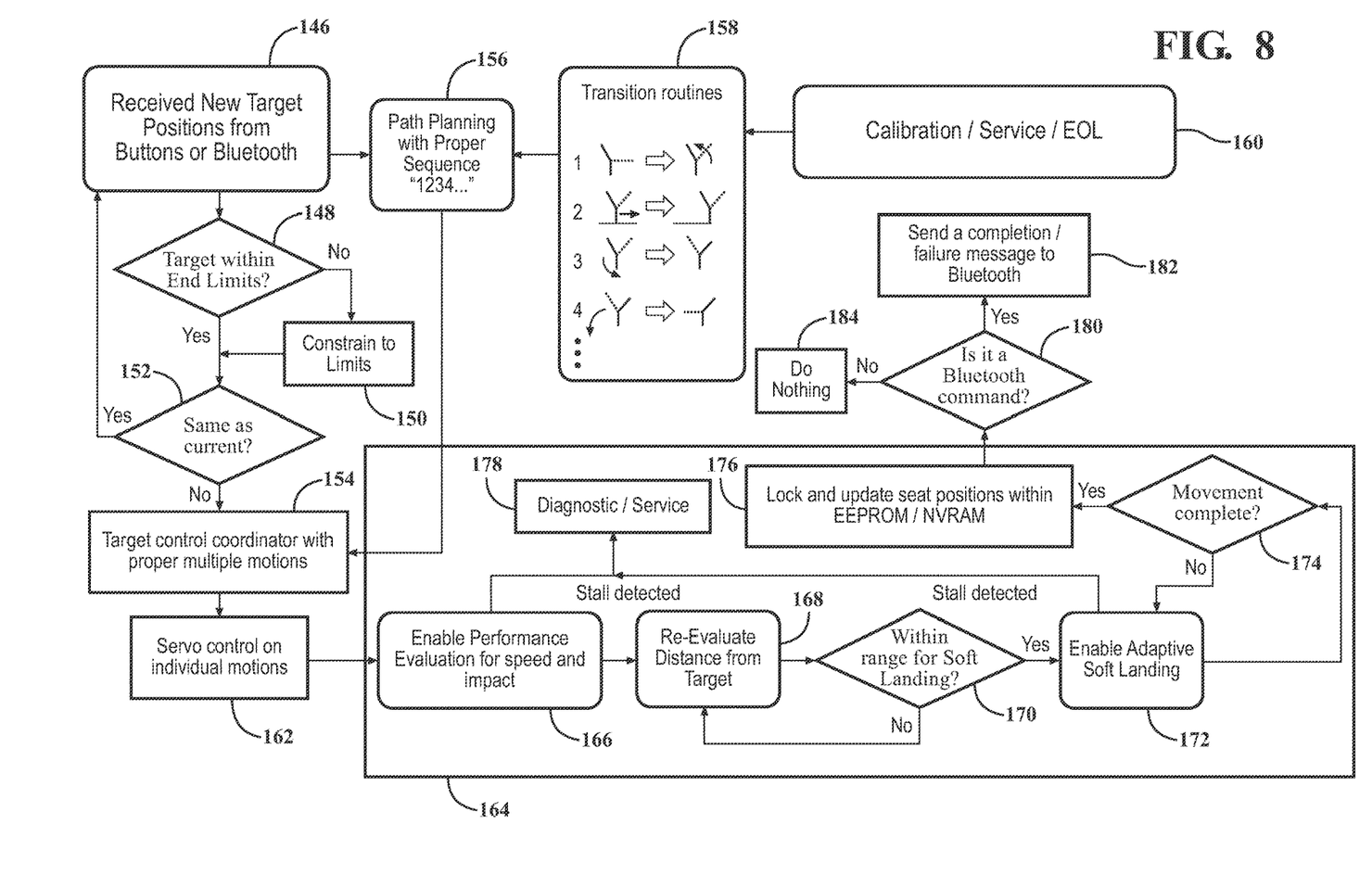
FIG. 8 depicts a flow diagram of a process performed by the advanced electronic control unit in accordance with a fourth embodiment of the present invention.

Referring to FIG. 8, the advanced ECU 20 also includes a process for adjusting the position and configuration of the seat assembly 10. The advanced ECU 20 receives the new target position from buttons or Bluetooth communication (step 146). The advanced ECU 20 determines whether the new target position is within end limits (step 148). If the new target position is not within end limits, then the advanced ECU 20 constrains the new target position to be within the end limits (step 150). The advanced ECU 20 then determines whether the new target position is the same as the current position (step 152). If the advanced ECU 20 determines that the new target position is the same as the current position, then the advanced ECU 20 continues to receive the new target position from the buttons or Bluetooth communication (step 146). If the new target position is not the same as the current position, then the advanced ECU 20 determines the proper sequence of motions to get the seat assembly 10 from the current position to the new target position (step 154). The advanced ECU 20 uses path planning to determine the proper sequence of motions (step 156). The advanced ECU 20 obtains various transition routines 158 stored in memory. For example, to shift a seat assembly 10 forward and rotate it so that it faces the back of the automotive vehicle, a transition routine may initially fold the seat cushion 12 up (step 1), before it moves the seat forward (step 2). The routine then rotates the seat so that it faces the rear of the automotive vehicle (step 3), and then folds the seat cushion 12 down (step 4). Some basic rules and transition routines 158 are stored in memory during an end-of-line calibration process (step 160). Path planning (step 156) will select the transition routines 158 from memory based on the surroundings, diagnostics status, performance status and the end goals.

While the target control module 28 coordinates the sequence of multiple motions (step 154), servos control individual motions (step 162). The advanced ECU 20 evaluates the movement of the seat assemblies 10 to ensure they are working properly (step 164). The performance evaluation module 26 monitors the speed and impact of each movement (step 166). If no stall is detected, the advanced ECU 20 re-evaluates the distance the seat assembly 10 is from the target position (step 168) and waits until it is within range of the target position for a soft landing (step 170). After the seat assembly 10 is within range of the target position, the advanced ECU 20 enables adaptive soft landing (step 172) and waits until the movement is complete (step 174). After the movement is complete, the advanced ECU 20 locks and updates the positions of the seat assembly 10 within the EEPROM or NVRAM (step 176). If at any time the advanced ECU 20 detects that the motor is stalled, the advanced ECU 20 sends the information to the mode manager 22 for further evaluation (i.e., to determine whether diagnostics or service are required and/or to determine any mitigation action) (step 178). After the seat position is locked in step 176, the advanced ECU 20 determines whether the command originated from a Bluetooth communication (step 180). If the command originated from a Bluetooth communication, the advanced ECU 20 sends a completion or a failure message to the Bluetooth communication (step 182). Otherwise, the process is complete, and the advanced ECU 20 takes no further action (step 184).

Figure 9:
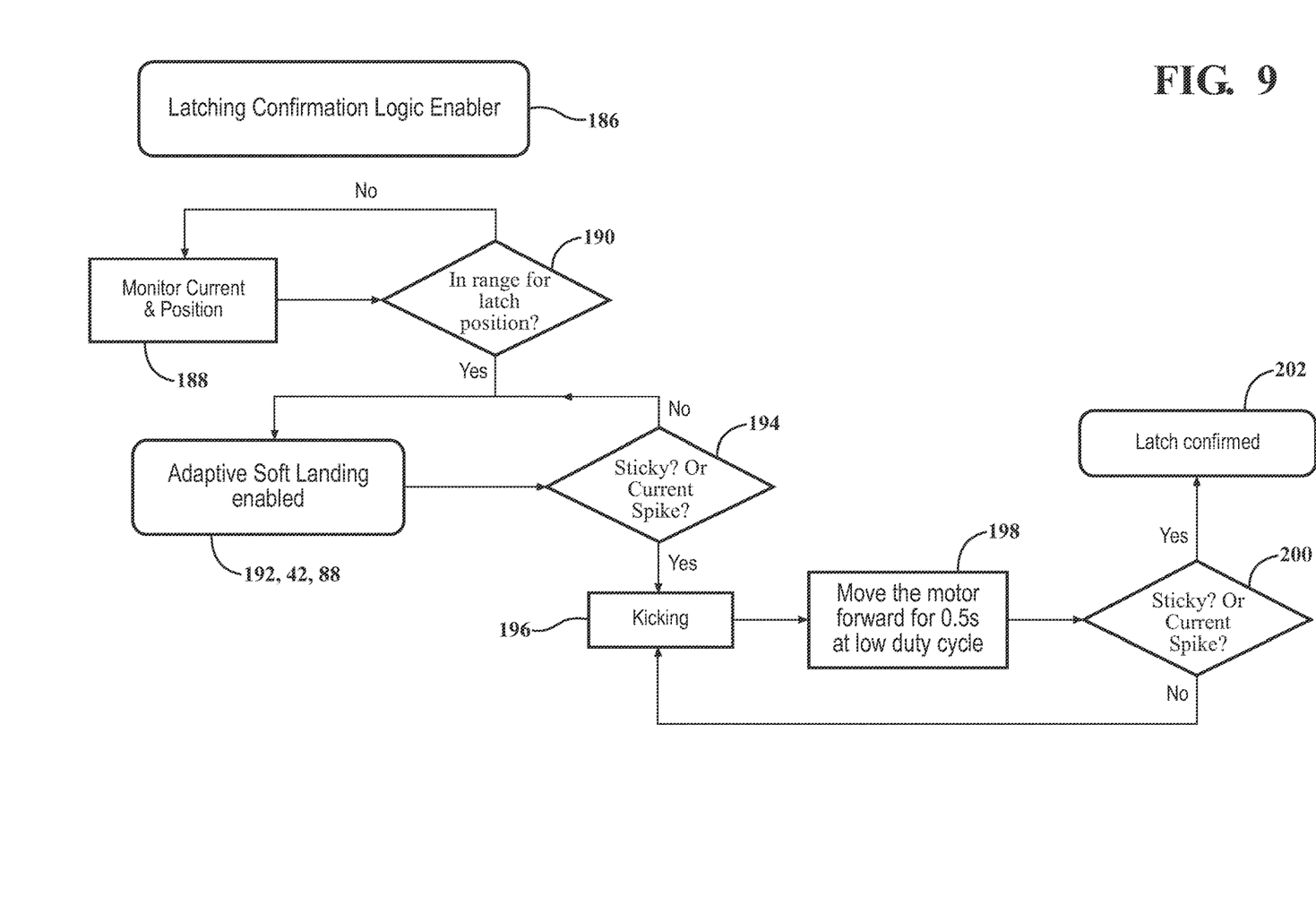
FIG. 9 depicts a flow diagram of a process performed by the advanced electronic control unit in accordance with a fifth embodiment of the present invention.

Referring to FIG. 9, the advanced ECU 20 also includes a latching confirmation logic enabler 186. The advanced ECU 20 monitors the current draw and position of the at least one motor (step 188) and waits for the seat assembly 10 to be in range to be latched (step 190). After the seat assembly 10 is in range to be latched, the advanced ECU 20 enables the adaptive soft landing (step 192). The advanced ECU 20 then monitors the motor until it determines that the motor is sticky or that there is a current spike (step 194). If the advanced ECU 20 determines that the motor is sticky or that there is a current spike, then the advanced ECU 20 performs a slight kicking motion (step 196) and moves the motor forward for 0.5 second at low duty cycle (step 198). If the latch has not yet locked, the slight kicking motion and short movement at low duty cycle help to lock the latch. Conversely, if the latch is already locked at this point, the seat assembly 10 will not move, so the slight movement will cause a current spike. If the advanced ECU 20 detects the current spike (step 200), the latch is confirmed to be locked (step 202) by monitoring the motor current and Hall effect position.

Figure 10:
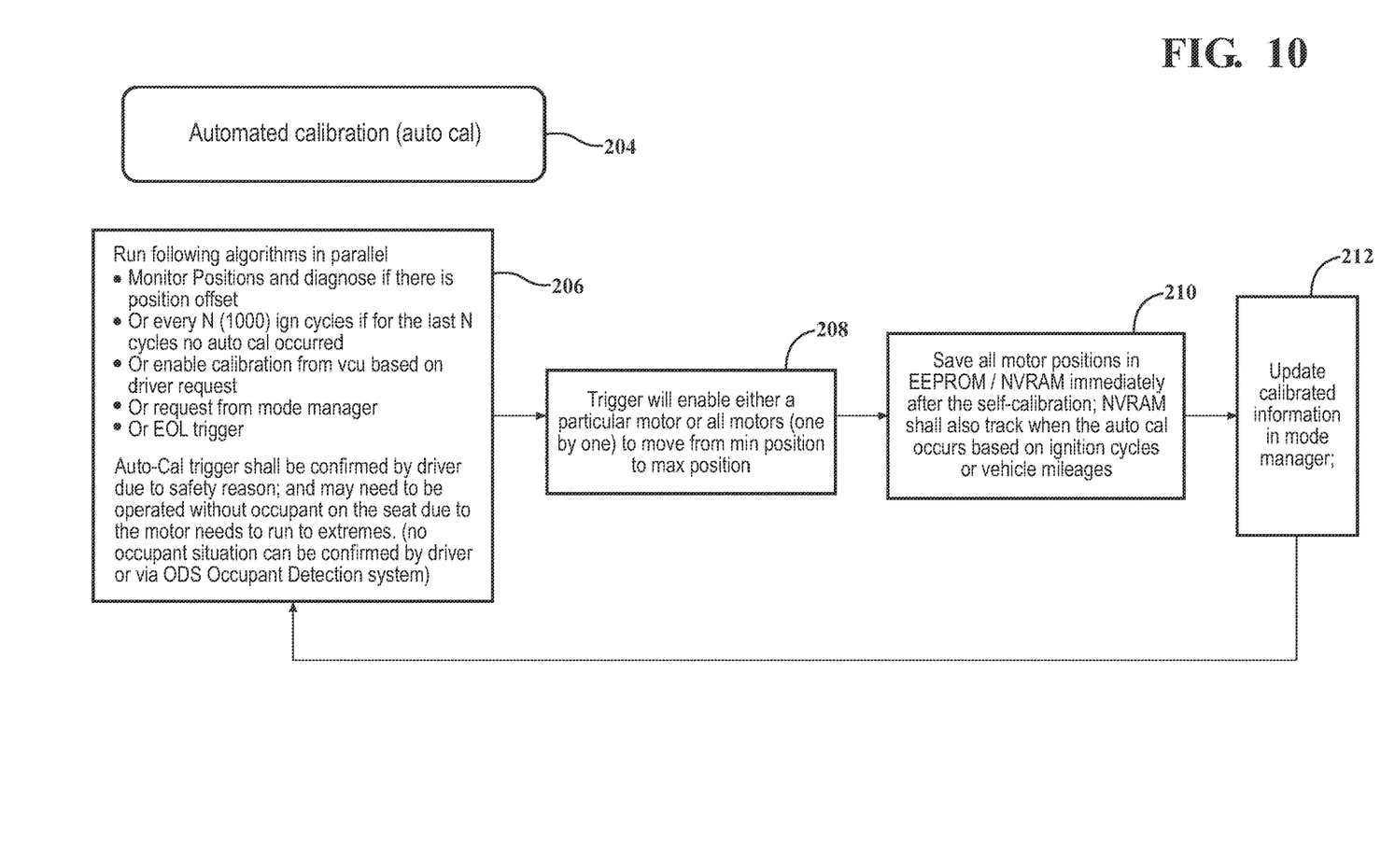
FIG. 10 depicts a calibration process performed by the advanced electronic control unit in accordance with the present invention.

Referring to FIG. 10, the advanced ECU 20 also performs automated calibration 204. During automated calibration 204, the advanced ECU 20 monitors the positions of the seat assemblies 10 and diagnoses if there is a position offset (step 206). The advanced ECU 20 performs automated calibration after a given amount of cycles (e.g., every 1000 ignition cycles). The advanced ECU 20 may also enable calibration from the vehicle control unit, or, if requested, by the mode manager 22 or an end-of-line trigger. The automated calibration trigger should be confirmed by the driver due to safety concerns. The automated calibration may need to be operated without an occupant on the seat because the motor needs to run to extremes. Either the driver or an occupant detection system may confirm that there is no occupant in the seating assembly 10 being tested.

The automated calibration trigger will enable either a particular motor or all motors (one at a time) to move from a minimum position to a maximum position (step 208) and will store all relevant information in the EEPROM or NVRAM (step 210). The advanced ECU 20 will also record when the automated calibration occurred to determine when to schedule the next calibration. The advanced ECU 20 then updates the calibrated information in the mode manager 22 (step 212).

Figure 11:
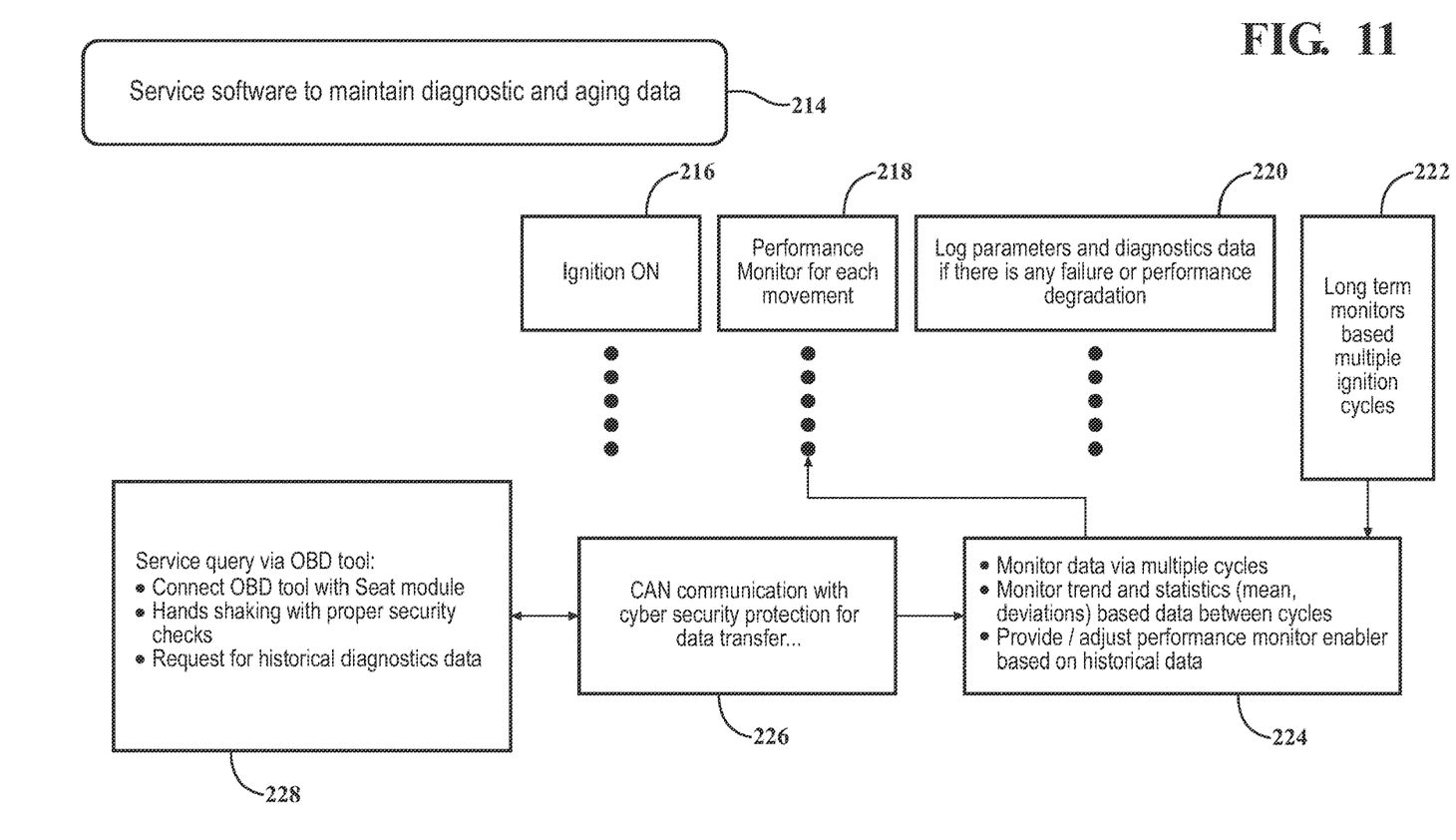
FIG. 11 depicts a diagnostic process performed by the advanced electronic control unit in accordance with the present invention.

Referring to FIG. 11, the advanced ECU 20 includes service software 214 to maintain diagnostic and aging data during the useful life of the system. Such information can be used to improve the performance of future products. Every time the ignition turns on (step 216), the advanced ECU 20 monitors performance for each movement (step 218). The advanced ECU 20 logs the parameters and diagnostics data if a failure or performance degradation is detected (step 220). The advanced ECU 20 periodically stores the parameters and diagnostics data over multiple ignition cycles (step 222). The advanced ECU 20 monitors data over multiple cycles, monitors trends and statistics (including means and deviations) between cycles, and provides and/or adjusts operating parameters based on historical data (step 224). A service tool is used to extract information from the ECU via CAN communication (controller area network), as is well known in the art. Such CAN communication also includes cyber security protection for data transfer (step 226). When the automotive vehicle is being serviced, on-board diagnostics (OBD) service tools may be connected with the seat module (step 228). Proper security checks are required before the OBD service tool can request historical diagnostics data from the automotive vehicle.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

The invention claimed is:

1. An electronic control unit configured to adapt to changes in operation of a seat assembly within an automotive vehicle, the electronic control unit comprising:
   a mode manager configured to;
      receive a request to reposition the seat assembly; and
      control at least one motor to reposition the seat assembly; and
   a performance evaluation module configured to:
      monitor operation of the at least one motor as the motor repositions the seat assembly;
      determine a smoothness with which the at least one motor stops;
      determine if the smoothness is abrupt; and
      if the performance evaluation module determines that the smoothness is abrupt, the performance evaluation module is configured to adjust the at least one motor to compensate for the abrupt motor stop before the mode manager receives another request to reposition the seat assembly.

2. The electronic control unit of claim 1, wherein the performance evaluation module compensates for the abrupt motor stop by reducing a duty cycle of the at least one motor.

3. The electronic control unit of claim 1, wherein the performance evaluation module is configured to monitor a position of the at least one motor and a current drawn by the at least one motor to determine if the at least one motor stops.

4. The electronic control unit of claim 3, wherein the performance evaluation module is configured to use the position of the at least one motor and the current drawn by the at least one motor to determine whether the motor stops abruptly.

5. The electronic control unit of claim 1, wherein the performance evaluation module is configured to determine if the abrupt motor stop was expected, and if the performance evaluation module determines that the motor stop was not expected, the performance evaluation module is configured to provide notification that service is required.

6. A method for controlling operation of a seat assembly in an automotive vehicle, the method comprising the steps of:
   monitoring operation of at least one motor while the at least one motor repositions the seat assembly;
   determining an impact on the at least one motor when the motor stops after repositioning the seat assembly;
   determining if the impact increases over time; and
   if it is determined that the impact increases over time, adjusting the at least one motor to compensate for the increase in impact.

7. The method of claim 6, wherein the step of compensating comprises reducing a duty cycle of the at least one motor.

8. The method of claim 6, further comprising the step of monitoring a position of the at least one motor and a current drawn by the at least one motor to determine if the at least one motor stops.

9. The method of claim 8, wherein the position of the at least one motor and the current drawn by the at least one motor are used to determine the impact on the at least one motor when the at least one motor stops.

10. The method of claim 6, further comprising the steps of:
    determining if the motor stop was expected;
    if it is determined that the motor stop was not expected, providing notification that service is required.

11. The method of claim 6, further comprising the steps of:
    determining if the operation of the at least one motor changes over time;
    if it is determined that the operation of the at least one motor changes over time, adjusting for the changes in the operation; and
    recording the changes in the operation in non-volatile memory.

12. An electronic control unit configured to adapt to changes in operation of a seat assembly within an automotive vehicle, the electronic control unit comprising:
    a mode manager configured to reposition the seat assembly from an initial position to a final position; and
    a performance evaluation module configured to:
       monitor movement of at least one motor while the at least one motor repositions the seat assembly from an initial position to a final position;
       monitor an amount of friction encountered by the at least one motor as the motor repositions the seat assembly;
       determine if the amount of friction increases as the at least one motor repositions the seat assembly; and
       if the performance evaluation module determines that the amount of friction increases, the performance evaluation module is configured to adjust the motor to overcome the increased friction in the movement of the at least one motor.

13. The electronic control unit of claim 12, wherein the performance evaluation module is configured to determine if the seat assembly is near the final position, and wherein the performance evaluation module overcomes the increased friction by increasing the duty cycle of the at least one motor if it determines that the seat assembly is near the final position, and the performance evaluation module overcomes the increased friction by applying a series of pulses to the at least one motor if it determines that the seat assembly is not near the final position.

14. The electronic control unit of claim 13, wherein the series of pulses comprise forward-moving pulses.

15. The electronic control unit of claim 13, wherein the series of pulses comprise alternating forward-moving and rearward-moving pulses.

16. The electronic control unit of claim 13, wherein the performance evaluation module is configured to determine if the series of pulses overcomes the increased friction to the at least one motor and if the performance evaluation module determines that the series of pulses does not overcome the increased friction, the performance evaluation module is configured to provide notification that service is required.

17. A method for controlling operation of a seat assembly in an automotive vehicle, the method comprising the steps of:
    monitoring movement of at least one motor while the at least one motor repositions the seat assembly from an initial position to a final position;
    monitoring an amount of friction encountered by the at least one motor as the motor repositions the seat assembly;
    determining if the amount of friction increases as the at least one motor repositions the seat assembly; and
    if it is determined that the amount of friction increases, adjusting the motor to overcome the increased friction.

18. The method of claim 17, further comprises the steps of:
- determining if the seat assembly is near the final position;
- if it is determined that the seat assembly is near the final position, the step of compensating comprises increasing a duty cycle of the at least one motor; and
- if it is determined that the seat assembly is not near the final position, the step of compensating comprises applying a series of pulses to the at least one motor.

19. The method of claim 18, wherein the series of pulses comprise forward-moving pulses.

20. The method of claim 18, wherein the series of pulses comprise alternating forward-moving and rearward-moving pulses.

21. The method of claim 18, further comprising the steps of:
- determining if the series of pulses overcomes the increased friction of the at least one motor; and
- if it is determined that the series of pulses does not overcome the increased friction of the at least one motor, providing notification that service is required.

22. The method of claim 17, further comprising the steps of:
- determining if the movement of the at least one motor changes over time;
- if it is determined that the movement of the at least one motor changes over time, adjusting for the changes in the movement; and
- recording the changes in movement in non-volatile memory.

23. The electronic control unit of claim 1, wherein the mode manager controls the at least one adjusted motor to reposition the seat assembly between a first position and a second position.

* * * * *